United States Patent
Ikemoto

(10) Patent No.: US 9,596,403 B2
(45) Date of Patent: Mar. 14, 2017

(54) DISTANCE DETECTING DEVICE, IMAGING APPARATUS, DISTANCE DETECTING METHOD AND PARALLAX-AMOUNT DETECTING DEVICE

(71) Applicant: CANON KABUSHIKI KAISHA, Tokyo (JP)

(72) Inventor: Kiyokatsu Ikemoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/672,008

(22) Filed: Mar. 27, 2015

(65) Prior Publication Data
US 2015/0281559 A1    Oct. 1, 2015

(30) Foreign Application Priority Data

Mar. 31, 2014    (JP) ................... 2014-074577

(51) Int. Cl.
*H04N 5/232*    (2006.01)
*H04N 9/04*    (2006.01)
(Continued)

(52) U.S. Cl.
CPC .......... *H04N 5/23212* (2013.01); *G02B 7/34* (2013.01); *G06T 7/0073* (2013.01); *H04N 5/23254* (2013.01); *H04N 5/347* (2013.01); *H04N 9/045* (2013.01); *H04N 13/0225* (2013.01); *G06T 2207/10004* (2013.01); *G06T 2207/10024* (2013.01); *G06T 2207/10028* (2013.01);
(Continued)

(58) Field of Classification Search
CPC .. H04N 19/117; H04N 9/045; H04N 5/23212; G06K 9/6215; G02B 7/34
See application file for complete search history.

(56) References Cited

U.S. PATENT DOCUMENTS 4,445,029 A * 4/1984 Nagaoka ................. G01S 17/46
                                                                  250/201.4
4,561,749 A    12/1985 Utagawa
(Continued)

FOREIGN PATENT DOCUMENTS

CN    1712989 A    12/2005
CN    102822863 A    12/2012
(Continued)

*Primary Examiner* — Ahmed A Berhan
(74) *Attorney, Agent, or Firm* — Canon USA, Inc. IP Division

(57) ABSTRACT

A distance detecting device includes a distance calculation unit configured to calculate a distance to a target of imaging based on a first signal corresponding to a luminous flux having passed through a first pupil region of an exit pupil in an imaging optical system, and a second signal corresponding to a luminous flux having passed through a second pupil region different from the first pupil region, and a signal processing unit configured to perform a filtering process on at least one of the first signal and the second signal by using a band pass filter having a lower number of cells in a first direction than a number of cells in a second direction perpendicular to the first direction, and a filter for phase correction having a higher number of cells in the first direction than the number of cells in the second direction.

21 Claims, 8 Drawing Sheets

(51) Int. Cl.
*H04N 13/02* (2006.01)
*H04N 5/347* (2011.01)
*G06T 7/00* (2006.01)
*G02B 7/34* (2006.01)

(52) U.S. Cl.
CPC .............. *G06T 2207/10148* (2013.01); *G06T 2207/10152* (2013.01); *G06T 2207/20024* (2013.01)

(56) References Cited

U.S. PATENT DOCUMENTS

| | | | |
|---|---|---|---|
| 5,367,153 A | | 11/1994 | Suda |
| 5,440,367 A | | 8/1995 | Suda |
| 5,874,719 A | * | 2/1999 | Hippenmeyer ......... G01S 17/36 235/454 |
| 6,441,855 B1 | | 8/2002 | Omata |
| 7,307,699 B2 | * | 12/2007 | Ohtomo ................. G01S 17/87 356/4.04 |
| 8,854,529 B2 | | 10/2014 | Yoshimura et al. |

FOREIGN PATENT DOCUMENTS

| | | |
|---|---|---|
| CN | 103379277 A | 10/2013 |
| JP | 02-001808 A | 1/1990 |
| JP | 3240648 B2 | 12/2001 |
| JP | 2013235055 A | 11/2013 |

* cited by examiner

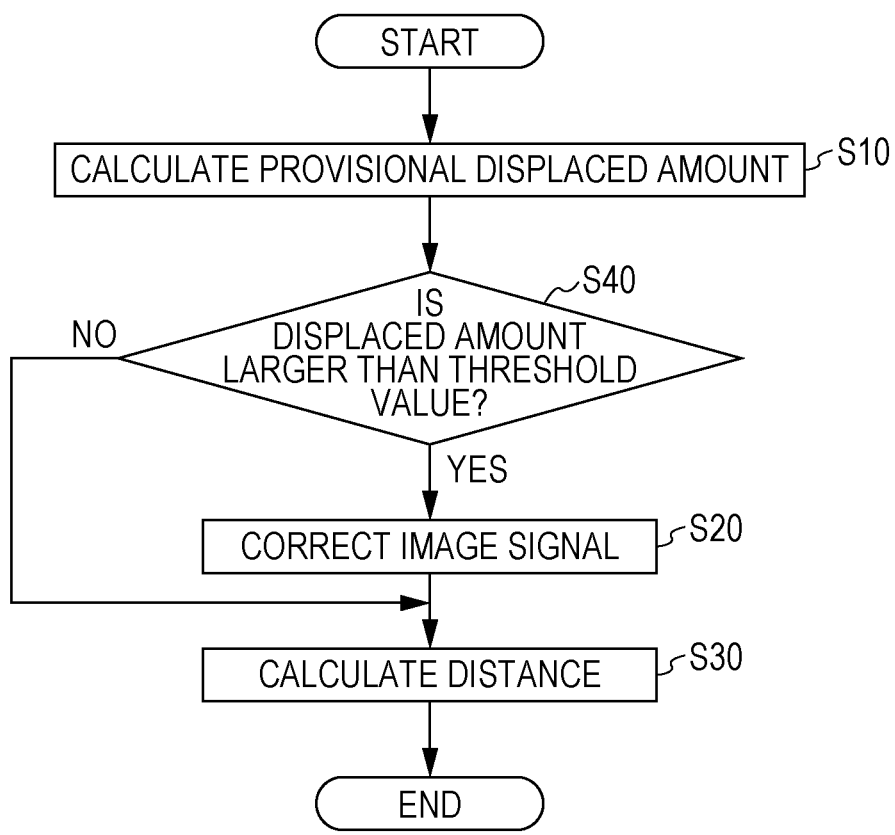

DISTANCE DETECTING DEVICE, IMAGING APPARATUS, DISTANCE DETECTING METHOD AND PARALLAX-AMOUNT DETECTING DEVICE

BACKGROUND OF THE INVENTION

Field of the Invention

The present invention relates to a distance detecting device, an imaging apparatus, a distance detecting method and a parallax-amount detecting device.

Description of the Related Art

A distance detection technology applicable to digital cameras has been known which detects a distance by using a phase difference detection method using a ranging function in partial pixels of an image pickup device. The pixels include photoelectric conversion units which receive a luminous flux having passed through different regions of a pupil of an imaging optical system, and displaced amounts of image signals generated by the photoelectric conversion units are estimated, and a defocus amount is calculated for ranging.

When the plurality of photoelectric conversion units have different pupil transmittance distributions from each other, the image signals have different shapes from each other. As a result, the accuracy of estimation of displaced amounts of the image signals may decrease, which may lower the accuracy of ranging. Japanese Patent No. 3240648 discloses an image shape correction technique. A point spread function or line spread function for generating an image signal is used to generate an image correction filter. Performing convolution on an image signal with the image correction filter to correct a shape of the image so that the accuracy of ranging may be improved.

An image correction filter using a point spread function disclosed in Japanese Patent No. 3240648 is an isotropic two-dimensional filter and has a higher number of taps than those of a one-dimensional filter. As a result, the calculation scale of the image correction processing is increased, and the processing time is increased. An image correction filter using a line spread function is a one-dimensional filter so that the processing time is shortened but a component having a partial space frequency of an image signal may be corrected while a component having other different space frequency has a correction error. Thus, some image signals (target of imaging) may have variations in image correction effect, and the accuracy of ranging may decrease.

SUMMARY OF THE INVENTION

The present invention provides a distance detecting device and a distance detecting method which allows high speed and high accuracy ranging, and a parallax-amount detecting device which detects a parallax amount at a high speed and with high accuracy.

A distance detecting device according to an aspect of the present invention includes a distance calculation unit configured to calculate a distance to a target of imaging based on a first signal corresponding to a luminous flux having passed through a first pupil region of an exit pupil in an imaging optical system, and a second signal corresponding to a luminous flux having passed through a second pupil region different from the first pupil region, and a signal processing unit configured to perform a filtering process on at least one of the first signal and the second signal by using a band pass filter having a lower number of cells in a first direction than a number of cells in a second direction perpendicular to the first direction, and a filter for phase correction having a higher number of cells in the first direction than the number of cells in the second direction.

A distance detecting method according to another aspect of the present invention includes calculating a distance to a target of imaging based on a first signal corresponding to a luminous flux having passed through a first pupil region of an exit pupil in an imaging optical system, and a second signal corresponding to a luminous flux having passed through a second pupil region different from the first pupil region, and performing a filtering process on at least one of the first signal and the second signal by using a band pass filter having a lower number of cells in a first direction than a number of cells in a second direction perpendicular to the first direction and a filter for phase correction having a higher number of cells in the first direction than the number of cells in the second direction.

A parallax-amount detecting device according to another aspect of the present invention includes a parallax-amount calculation unit configured to calculate a parallax amount based on a first signal corresponding to a luminous flux having passed through a first pupil region of an exit pupil in an imaging optical system, and a second signal corresponding to a luminous flux having passed through a second pupil region different from the first pupil region, and a signal processing unit configured to perform a filtering process on at least one of the first signal and the second signal by using a band pass filter having a lower number of cells in a first direction than a number of cells in a second direction perpendicular to the first direction and a phase correction filter having a higher number of cells in the first direction than the number of cells in the second direction.

Further features of the present invention will become apparent from the following description of embodiments with reference to the attached drawings. Each of the embodiments of the present invention described below can be implemented solely or as a combination of a plurality of the embodiments or features thereof where necessary or where the combination of elements or features from individual embodiments in a single embodiment is beneficial.

BRIEF DESCRIPTION OF THE DRAWINGS

FIG. 8 illustrates an example of a flow in a distance detecting method according to a fourth embodiment.

DESCRIPTION OF THE EMBODIMENTS

First Embodiment
Distance Detecting Device

Though a digital still camera is used as an example of an imaging apparatus having a distance detecting device according to the present invention in the description below, applications of the present invention are not limited to this. For example, a distance detecting device according to the present invention is applicable to a digital video camera and a digital distance measurement device. In the description with reference to drawings, like numbers refer to like parts throughout in principle, and repetitive descriptions will be omitted as much as possible.

Figure 1A:
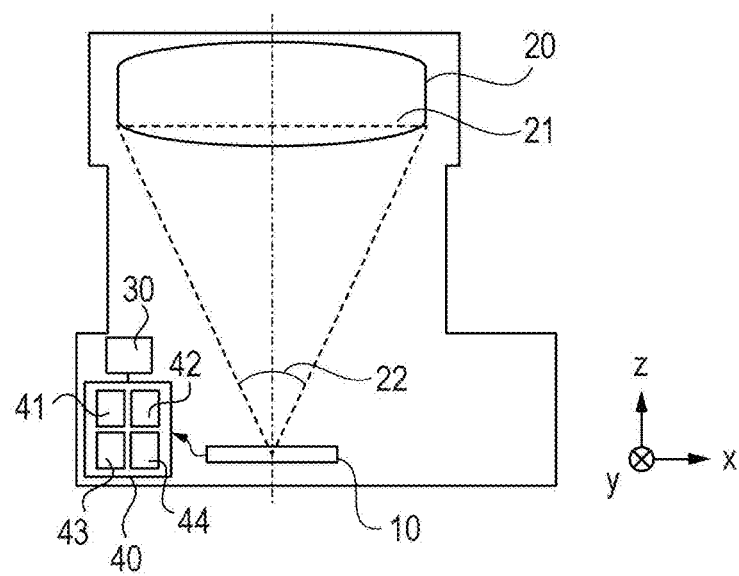
FIGS. 1A, 1B, and 1C are schematic diagrams illustrating an example of an imaging apparatus having a distance detecting device according to a first embodiment.

FIG. 1A is a schematic diagram of an imaging apparatus having a distance detecting device 40 according to a first embodiment. The imaging apparatus includes an image pickup device 10, an imaging optical system 20 and a recording device (memory) 30 in addition to the distance detecting device 40. The imaging apparatus further includes a driving mechanism for causing the imaging optical system 20 to focus, a shutter, a viewing image generation unit, and a liquid crystal display, for example, for image checking.

Figure 1B:
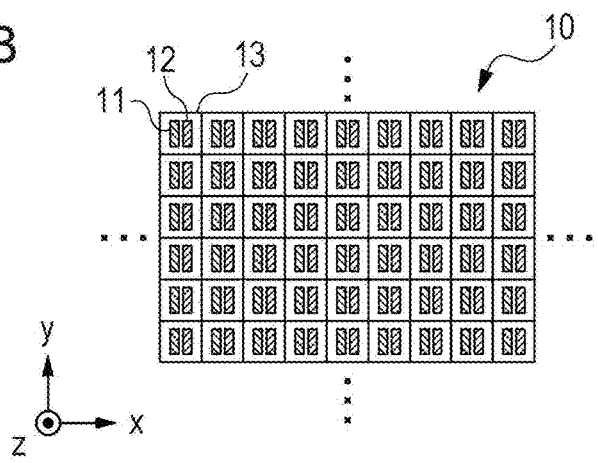

FIG. 1B is a schematic diagram illustrating an example of the image pickup device 10. The image pickup device 10 has a plurality of pixels 13 each including photoelectric conversion units 11 and 12. The image pickup device 10 may specifically be a solid-state image pickup device such as a CMOS sensor (sensor using a complementary metal-oxide-semiconductor) or a CCD sensor (sensor using a charge-coupled device), for example.

Figure 1C:
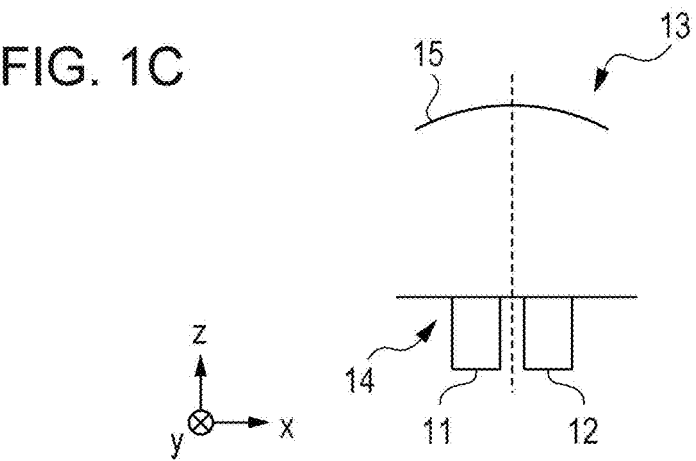

FIG. 1C is a schematic cross section diagram illustrating an example of the pixel 13. The photoelectric conversion units 11 and 12 of the pixel 13 are provided within a substrate 14. The pixel 13 further has a microlens 15.

As illustrated in FIGS. 1A to 1C, the imaging optical system 20 forms an image of an external target of imaging on a plane of the image pickup device 10. The image pickup device 10 acquires a luminous flux having passed through an exit pupil 21 in the imaging optical system 20 by using the photoelectric conversion unit 11, or the photoelectric conversion unit 12 in the pixel 13 through the microlens 15 and converts it to an electric signal. More specifically, a luminous flux having passed through a first pupil region of the exit pupil 21 is converted to an electric signal in the photoelectric conversion unit 11 of each of the pixels 13, and a luminous flux having passed through a second pupil region different from the first pupil region of the exit pupil 21 is converted to an electric signal by the photoelectric conversion unit 12 in each of the pixels 13. Each of the pixels 13 has a floating diffusion (FD) unit, a gate electrode, wiring and so on for outputting an electric signal to the distance detecting device 40.

The distance detecting device 40 may include a signal processing substrate having a CPU and memory, for example, and the CPU executes a program to implement functionality of the distance detecting device 40. The signal processing substrate may have an integrated circuit in which semiconductor devices are integrated, including an IC, an LSI, a system LSI, a micro processing unit (MPU), and a central processing unit (CPU), for example.

The distance detecting device 40 has a distance calculation unit 41 which calculates a distance to a target of imaging based on a first signal corresponding to a luminous flux having passed through the first pupil region of the exit pupil 21 in the imaging optical system 20, and a second signal corresponding to a luminous flux having passed through the second pupil region. The first signal corresponds to a set of electric signals (components) generated by the photoelectric conversion units 11 in the pixels, and contains positions of pixels and electric signals (components) generated by the photoelectric conversion units 11 in the pixels in association. The second signal corresponds to a set of electric signals (components) generated by the photoelectric conversion units 12 in the pixels and contains positions of the pixels and electric signal (components) generated by the photoelectric conversion units 12 in the pixels. If a signal acquired by performing noise removal and filtering processing on the first signal is a signal corresponding to a luminous flux having passed through the first pupil region of the exit pupil 21 in the imaging optical system 20, the signal is contained in the first signal. The second signal may be defined similarly.

The distance detecting device 40 includes a signal processing unit 42, a displaced-amount calculation unit 43, and a filter generation unit 44 in addition to the distance calculation unit 41. The signal processing unit 42 has a function for performing a filtering process on at least one of the first signal and the second signal. The displaced-amount calculation unit 43 has a function for calculating a displaced amount between the first signal and second signal. The filter generation unit 44 has a function for generating a filter to be used for a filtering process by the signal processing unit 42 based on the displaced amount calculated by the displaced-amount calculation unit 43.

The recording device 30 has a function for recording a signal which has been read out or a computation result.

In the distance detecting device according to the present invention having a plurality of photoelectric conversion units as in the pixel 13, signals acquired by the photoelectric conversion units in the pixel 13 may be added to generate an image signal equivalently to a pixel having a single photoelectric conversion unit. Such a pixel 13 may be provided in all pixels of the image pickup device 10. Alternatively, pixels each having a single photoelectric conversion unit and pixels 13 each having a plurality of photoelectric conversion units may both be provided. In the latter configuration, ranging may be performed in the pixels 13 each having a plurality of photoelectric conversion units, and the other pixels may acquire an image of a target of imaging. The pixels 13 may be located discretely in the image pickup device 10 or may be located at different intervals in an X direction and a Y direction.

Distance Detecting Method

According to the present invention, a distance between the imaging optical system 20 and the image pickup device 10 is long with respect to the size of the pixel 13. Thus, luminous fluxes having passed through different positions of the exit pupil 21 of the imaging optical system 20 enter onto a plane of the image pickup device 10 as luminous fluxes having different incident angles. The photoelectric conversion units 11 and 12 receive luminous fluxes from a predetermined angle range 22 (FIG. 1A) in accordance with the shape of the exit pupil 21 and the positions of the photoelectric conversion units 11 and 12 on the image pickup device 10. A sensitivity distribution of the exit pupil acquired by projecting, on the exit pupil in accordance with angles, a sensitivity characteristic of the photoelectric conversion units 11 and 12 for received luminous fluxes will be called a pupil transmittance distribution. The centroid position of the pupil transmittance distribution will be called a pupil centroid. The pupil centroid may be calculated by using the following Expression (1).

$$g = \frac{\int r \cdot t(r) dr}{\int t(r) dr} \qquad (1)$$

In Expression (1), r represents coordinates of the exit pupil 21, and t is a pupil transmittance distribution of the photoelectric conversion units 11 and 12, and the integration range is a region of the exit pupil 21.

In a region through which a luminous flux to be received by a photoelectric conversion unit passes, a region including the pupil centroid, and an exit pupil through which a luminous flux entering from an angle range where the photoelectric conversion unit has a high sensitivity passes will be called a pupil region. A direction connecting pupil centroids of two pupil regions (a first pupil region and a second pupil region) is called a direction where a pupil is divided (direction of pupil division). According to this embodiment, the direction of pupil division is in an x-direction of a plane (xy-plane in FIG. 1B) of the image pickup device where a plurality of pixels are arranged two-dimensionally, and the direction will be called a first direction. A y-direction perpendicular to the x-direction of the plane will be called a second direction.

Figure 2A:
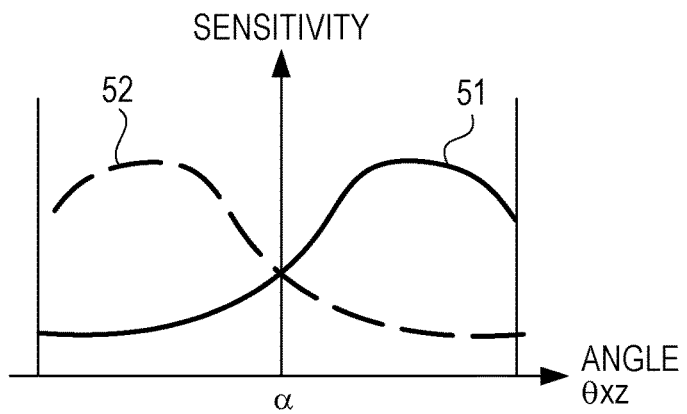
FIGS. 2A, 2B, and 2C illustrate a sensitivity characteristic of a ranging pixel and a pupil region.

FIG. 2A illustrates a sensitivity characteristic 51 of the photoelectric conversion unit 11, and a sensitivity characteristic 52 of the photoelectric conversion unit 12, with respect to a luminous flux incident on an xz-plane. The abscissa axis indicates an angle formed by the incident luminous flux within the xz-plane and a z-axis, and the ordinate axis indicates a sensitivity. α indicates an incident angle of a main beam entering a pixel. The incident angle is based on an in-plane direction of the image pickup device and a vertical direction (Z-direction). When the pixel 13 is positioned at a center of the image pickup device 10, α is zero. When the pixel 13 is positioned in a circumferential part, α has a value excluding zero.

Figure 2B:
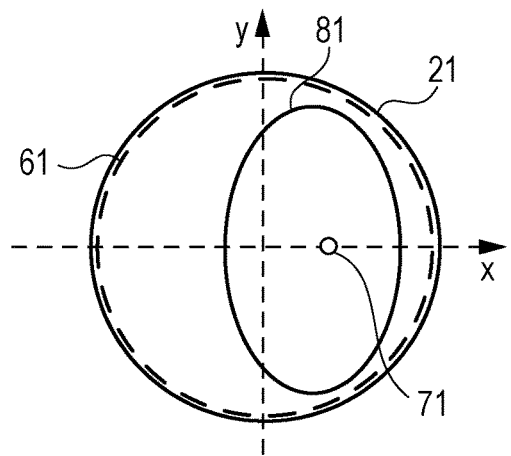

FIG. 2B illustrates the exit pupil 21 in the imaging optical system 20 and a pupil transmittance distribution 61, a pupil centroid 71 and a pupil region 81 (first pupil region) corresponding to the photoelectric conversion unit 11. The pupil region 81 is off-center from the exit pupil 21 in the +x direction (first direction). The photoelectric conversion unit 11 in each of the pixels 13 is configured to receive a luminous flux having mainly passed through the pupil region 81. With this configuration, a first signal $S_1$ corresponding to the luminous flux having passed through the pupil region 81 may be acquired.

Figure 2C:
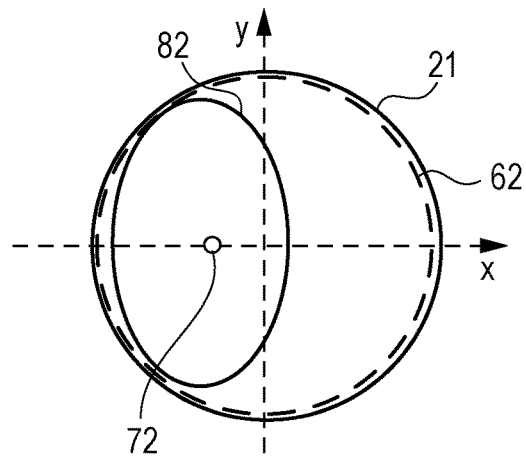

FIG. 2C illustrates the exit pupil 21 in the imaging optical system 20 and a pupil transmittance distribution 62, a pupil centroid 72 and a pupil region 82 (second pupil region) corresponding to the photoelectric conversion unit 12. The pupil region 82 is a pupil region off-center from the exit pupil 21 in the −x direction. The photoelectric conversion unit 12 in each of the pixels 13 is configured to receive a luminous flux having mainly passed through the pupil region 82. With this configuration, a second signal $S_2$ corresponding to the luminous flux having passed through the pupil region 81 is acquired.

A signal $S_j$ (j=1 or 2) may be expressed by the following expression (2).

$$S_j = f * PSF_j \qquad (2)$$

Here, f is a light quantity distribution of a target of imaging, and is a convolution. $PSF_j$ is a transfer function representing a degree of degradation due to the imaging optical system 20 and the image pickup device 10 when a luminous flux from a target of imaging is acquired as a signal $S_j$ and will be called a point spread function. A difference in shape between $PSF_1$ and $PSF_2$ determines a difference in shape between the signals $S_1$ and $S_2$.

The signal $S_j$ (j=1 or 2) in a frequency space is expressed by the following expression (3).

$$S_j = iFFT\{Ff \cdot OTF_j\} = iFFT\{Ff_{(fx,fy)} \cdot MTF_{j(fx,fy)} \cdot \exp[iPTF_{j(fx,fy)}]\} \qquad (3)$$

F is a Fourier transform, Ff is a result of a Fourier transform on a light quantity distribution f of a target of imaging and iFFT indicates an inverse Fourier transform. $OTF_j$ is a transfer function acquired by performing a Fourier transform on the point spread function $PSF_j$ and will be called an optical transfer function. $OTF_j$ is expressed as a function having a modulation transfer function $MTF_j$ as an amplitude term and a phase transfer function $PTF_j$ as a phase term in a space frequency region. (fx,fy) is a space frequency in the (x,y) in-plane direction, fx is a space frequency in the x-direction, and fy is a space frequency in the y-direction. $MTF_j$ and $PTF_j$ are functions determining variations in an amplitude and a position, respectively, of each space frequency component, which is caused by a transfer. $OTF_j$, $MTF_j$, and $PTF_j$ are an optical transfer function corresponding to a jth pupil region, a modulation transfer function corresponding to a jth pupil region, and a phase transfer function corresponding to a jth pupil region, respectively. Here, j is equal to 1 or 2.

A distance to a target of imaging is calculated from a signal displaced amount in the direction of pupil division (first direction, x-direction) between the signal $S_1$ and the signal $S_2$. The displaced amount is acquired by any known method. For example, correlation calculations are performed by displacing one signal of a pair of signals ($S_1$ and $S_2$) in the x-direction, and a displaced amount with a highest correlation may thus be calculated. A defocus amount is acquired by any known method from the calculated displaced amount, and a distance to a target of imaging may thus be calculated.

Different characteristics of $MTF_1$ and $MTF_2$ and $PTF_1$ and $PTF_2$ may result in different shapes of the signals $S_1$ and $S_2$. $PSF_j$ is acquired in correspondence with the signal $S_j$ and varies in accordance with an optical characteristic (such as a focal distance, an aperture, and a defocus amount) of the imaging optical system 20, a sensitivity characteristic and a position of the pixel 13 on the image pickup device 10. The same is also true for $OTF_j$, $MTF_j$, and $PTF_j$.

Figure 3A:
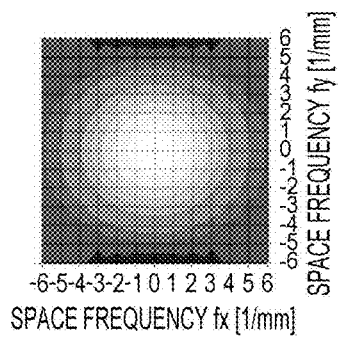
FIGS. 3A, 3B, 3C, 3D, 3E, and 3F illustrate a point spread function.
Figure 3B:
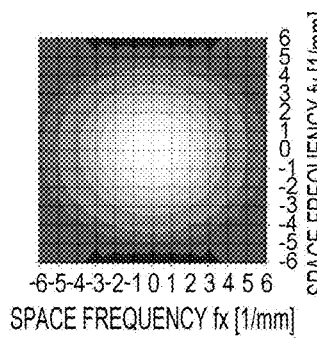
Figure 3C:
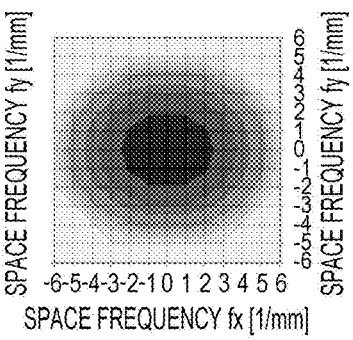
Figure 3D:
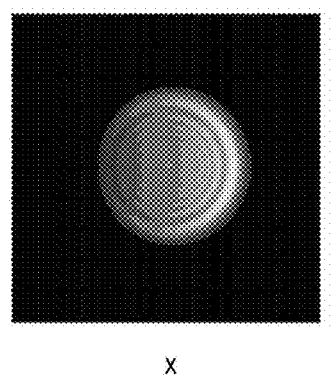
Figure 3E:
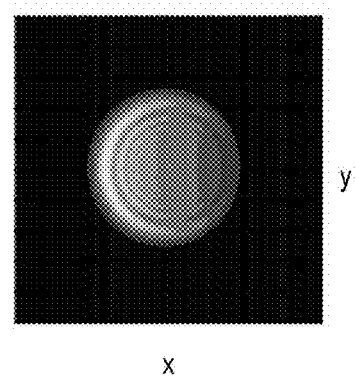
Figure 3F:
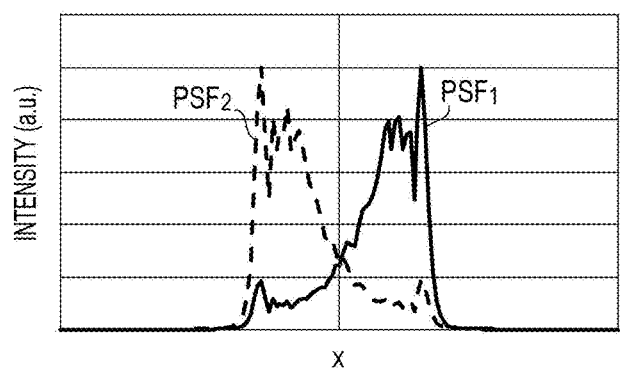

FIGS. 3A, 3B and 3C illustrate amounts acquired by converting the $MTF_1$, $MTF_2$, and a phase difference $PTF_1$-$PTF_2$ to displaced amounts of space frequency components in a defocus state. The ordinate axis and abscissa axis are represented by space frequencies fy and fx, respectively. FIGS. 3D and 3E illustrate $PSF_1$ and $PSF_2$, respectively, and the ordinate axis and abscissa axis represent a y-coordinate and an x-coordinate, respectively. As values increase, the brightness increases in those drawings. FIG. 3F illustrates a cross section taken in the x-direction of $PSF_1$ and $PSF_2$, and the solid line represents $PSF_1$, and the broken line represents $PSF_2$. As illustrated in FIGS. 3A, 3B, and 3C, different displaced amounts in accordance with space frequencies with respect to $MTF_1$, $MTF_2$, and $PTF_1$-$PTF_2$ may result in mutually different shapes of $PSF_1$ and $PSF_2$ as illustrated in FIGS. 3D, 3E and 3F. As a result, pairing image signals (first signal $S_1$ and second signal $S_2$) have different shapes. In such a case, an error may occur easily when the displaced amounts between the first signal $S_1$ and the second signal $S_2$ is calculated. Thus, the accuracy of the distance detection may decrease.

In order to prevent this, preprocessing using an image-signal correction filter may be performed. The present invention relates to such preprocessing and aims to reduce the processing time of such preprocessing. The preprocessing will be described based on a distance detecting method of the present invention.

Figure 4A:
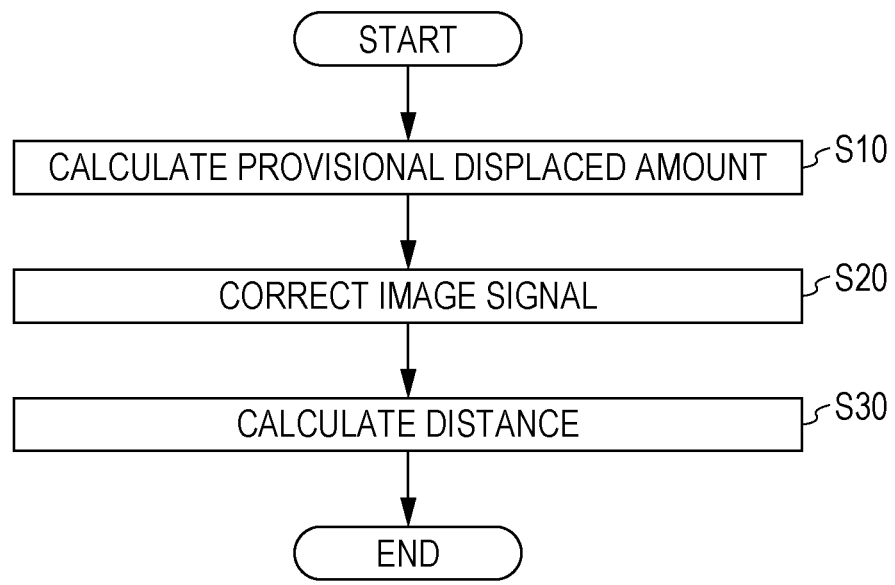
FIGS. 4A and 4B illustrate examples of flows of a distance detecting method according to the first embodiment.
Figure 4B:
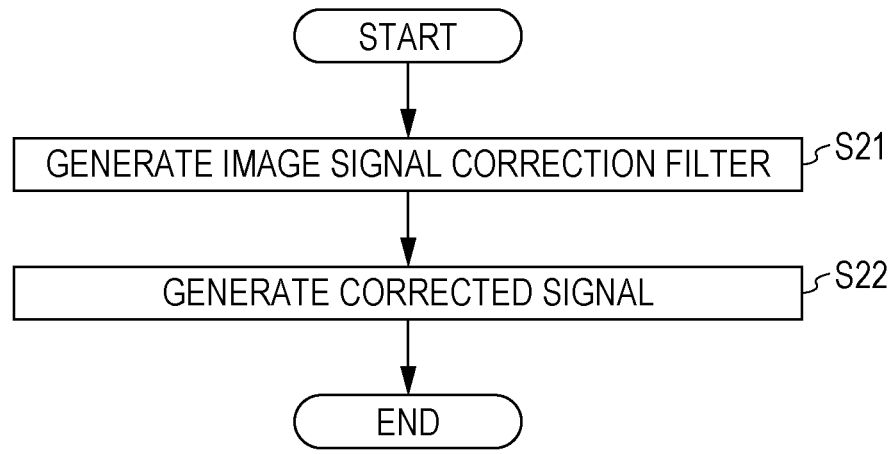

FIGS. 4A and 4B illustrate examples of flowcharts according to a distance detecting method, which detects a distance to a target of imaging, performed by the distance detecting device 40. The distance detecting method includes a process for calculating a provisional displaced amount, a process for correcting an image signal (signal processing), and a process for calculating a distance. According to this embodiment, the preprocessing here refers to a process for calculation of a provisional displaced amount and a process for correcting an image signal (signal processing). Process for Calculating Provisional Displaced Amount As illustrated in FIG. 4A, the displaced-amount calculation unit 43 calculates a provisional displaced amount from the first signal $S_1$ and the second signal $S_2$ (step S10). The displaced amount may be acquired by the known method as described above.

Process for Correcting Image Signal

Next, as illustrated in FIG. 4A, the signal processing unit 42 performs an image signal correction process on the first signal $S_1$ and the second signal $S_2$ (step S20). As a result of step S20, corrected signals $CS_1$ and $CS_2$ are generated.

The image correction process step S20 has a process for generating an image-signal correction filter (step S21) and a process for generating a corrected signal (step S22) as illustrated in FIG. 4B. In step S21, the filter generation unit 44 generates an image-signal correction filter based on the provisional displaced amount calculated in step S10. For example, filters may be generated in advance based on a state (such as a focal distance, an aperture and a defocus amount) of the imaging optical system, a position (image height) of the pixel 13 on the image pickup device 10, and the magnitude of the provisional displaced amount. Data (such as cell value) on the filters may be recorded in the recording device 30. Then, with reference to the filter data based on a state of the imaging optical system, the image height, and the magnitude of the detected provisional image displaced amount, image-signal correction filters may be generated.

Alternatively, a filter data set corresponding to a representative provisional displaced amount may be retained in advance, and filter data sets retained in advance may be interpolated to generate a filter corresponding to provisional displaced amounts excluding the representative value. Further alternatively, filter data sets may be approximated with a function, and coefficients of the function may be retained. For example, cell values of a filter may be approximated with an n-order function (where n is a positive integer) having a position within the filter as a variable, and coefficients of the function may be retained in advance. Next, a coefficient may be read out in accordance with a given ranging condition to generate a filter. According to the method as described above, the amount of filter data to be retained may be reduced, and the required space for retaining such filters may be reduced.

FIGS. 5A to 5D illustrate examples of image-signal correction filters. According to this embodiment, a total of four filters Fy11, Fx11, Fy12, and Fx12 are generated to perform two different filtering processes on the first signal $S_1$ and the second signal $S_2$.

The filter Fy11 (first filter) is a filter having a number of cells Ax (where Ax is an integer equal to or higher than 1) in a first direction (x-direction) which is lower than the number of cells Ay (where Ay is an integer equal to or higher than 2) in a second direction (y-direction) perpendicular to the first direction. The cell value (filter data) of the cell 50 is set to a desired value by the process of generating an image-signal correction filter in step S21. Such a filter is assumed as a filter having Ax×Ay cells. The filter Fy11 is a band pass filter which limits the band of a space frequency fy of the first signal $S_1$ to a predetermined range. The example in FIG. 5A will be described by assuming Ax=1.

The filter Fx11 (second filter) is a filter having a number of cells Bx (where Bx is an integer equal to or higher than 2) in the x-direction which is higher than a number of cells By (where By is an integer equal to or higher than 1) in the y-direction. In other words, the filter Fx11 has Bx ×By cells, and each of cells 50 has a desired cell value (filter data). The filter Fx11 is a filter which corrects a phase in an fx direction of each space frequency component of the signal $S_1$. Such a filter will be called a phase correction filter hereinafter. The example in FIG. 5B will be described by assuming By=1.

The filter Fy12 (third filter) is a filter having a number of cells Cx (where Cx is an integer equal to or higher than 1) in the x-direction which is lower than a number of cells Cy (where Cy is an integer equal to or higher than 2) in the y-direction. In other words, the filter Fy12 has Cx×Cy cells, and each of the cells 50 has a desired cell value (filter data). The filter Fy12 is a band pass filter which limits the band of a space frequency fy of the signal $S_2$ to a predetermined range. The example in FIG. 5A will be described by assuming Cx=1.

The filter Fx12 (fourth filter) is a filter having a number of cells Dx (Dx is an integer equal to or higher than 2) in the x-direction which is higher than the number of cells Dy (where Dy is an integer equal to or higher than 1) in the y-direction. In other words, the filter Fx12 has Dx×Dy cells, and each of the cells 50 has a desired cell value (filter data). The filter Fx12 is a phase correction filter which corrects a phase in the fx direction of each space frequency component of the signal $S_2$. The example in FIG. 5B will be described by assuming Dy=1.

The filter Fx11 is a phase correction filter corresponding to an optical transfer function $OTF_2$, and the filter Fx12 is a phase correction filter corresponding to an optical transfer function $OTF_1$.

The filters Fy1$j$ and Fx1$j$ ($j$=1 or 2) are expressed by the following Expression (4) and Expression (5)

$$Fy1j = iFFT\{BP_{Fy1j(fy)}\} \quad (4)$$

$$Fx1j = iFFT\{BP_{Fx1j(fx)} \cdot \exp[iHP_{Fx1j(fx)}]\} \quad (5)$$

$BP_{Fy1j}$ and $BP_{Fx1j}$ are amplitude terms of the filters, and $HP_{Fx1j}$ is a phase term of the filter.

Figure 5A:
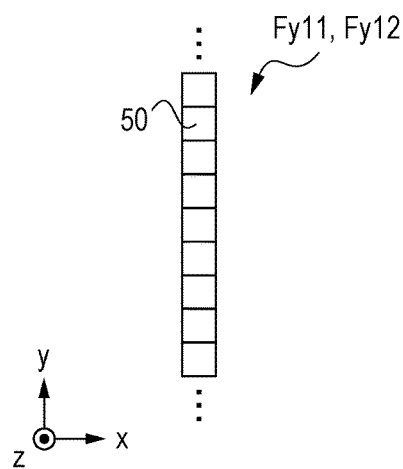
FIGS. 5A, 5B, 5C, and 5D illustrate a filter for image signal correction processing according to the first embodiment.
Figure 5B:
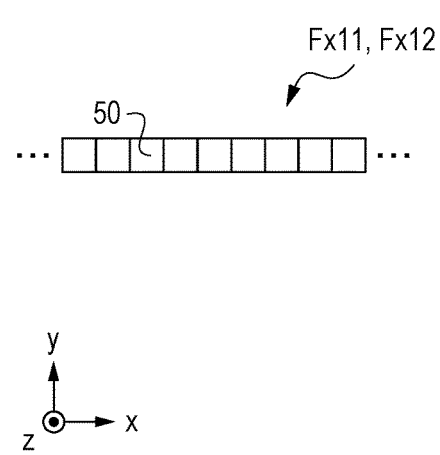
Figure 5C:
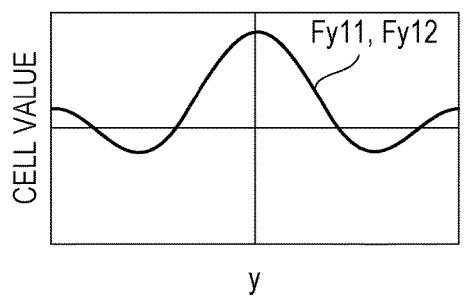

FIG. 5C illustrates an example of a distribution of cell values of the filters Fy11 and Fy12. Because filters Fy11 and Fy12 do not have a phase term in a frequency space and only have an amplitude term, cell values have a centro-symmetrical distribution about the x-axis in the y-direction.

Figure 5D:
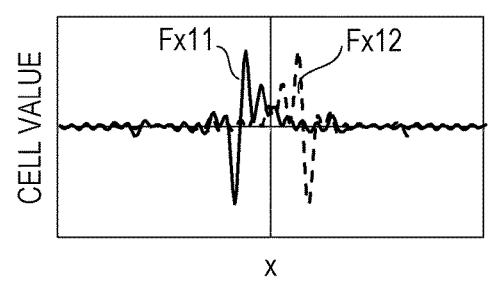

FIG. 5D illustrates an example of a distribution of cell values of the filters Fx11 and Fx12. Because the filters Fx11 and Fx12 perform a phase correction, the phase terms $HP_{Fx1}$ and $HP_{Fx2}$ have phases at different positions in the x-direction in a real space between space frequency components.

Because the filters Fx11 and Fx12 have such different phase terms, cell values have a centro-symmetrical distribution about the y-axis in the x direction. According to this embodiment, the filters Fy11 and Fy12 are low pass filters which limit a space frequency fy to a lower frequency band (near 0) and both have the same limited band. The filters Fx11 and Fx12 are filters which control phases of space frequency components only, and have in their phase terms the phase transfer function $PTF_2$ corresponding to the second pupil region and the phase transfer function $PUF_F$ corresponding to the first pupil region, respectively. In other words, the filters Fx11 and Fx12 may be expressed as follows by Expression (6) and Expression (7).

$$Fx11 = iFFT\{\exp[i(PTF_{2(fx,0)} - PG_{2(fx,0)})]\} \quad (6)$$

$$Fx12 = iFFT\{\exp[i(PTF_{1(fx,0)} - PG_{1(fx,0)})]\} \quad (7)$$

It is assumed here that $BP_{Fx11}$ and $BP_{Fx12}$ are 1 because the filters Fx11 and Fx12 do not correct amplitudes. $PTF_{j(fx,0)}$ represents a phase where the space frequency fy of the phase transfer function $PTF_j$ is 0. $PG_j$ is a phase adjustment term acquired by converting a moving amount caused by a defocus of a centroid position of $PSF_j$ to a phase amount of each space frequency and does not have an influence on a shape of an image signal. It is added to prevent a shift of a corrected signal generated by the image signal correction processing by a moving amount of $PSF_j$.

Next, the signal processing unit 42 performs a convolution on the first signal $S_1$ by the filters Fy11 and Fx11 generated in step S21 to generate a corrected signal $CS_1$ (step S22). The signal processing unit 42 performs a convolution on the second signal $S_2$ by the filters Fy12 and Fx12 generated in step S21 to generate a corrected signal $CS_2$ (step S22). More specifically, a filtering process is performed on the first signal $S_1$ by using the filter Fy11 to generate signal $S_1'$, and a filtering process is further performed on the signal $S_1'$ by using the filter Fx11 to generate a corrected signal $CS_{11}$. A filtering process is performed on the second signal $S_2$ by using the filter Fy12 to generate a signal $S_2'$, and a filtering process is further performed on the signal $S_2'$ by using the filter Fx12 to generate a corrected signal $CS_{12}$. Because the thus generated corrected signal $CS_{11}$ corresponds to a luminous flux having passed through the first pupil region of the exit pupil 21 in the imaging optical system 20, the corrected signal $CS_{11}$ is the first signal. Similarly, because the second corrected signal $CS_{12}$ corresponds to a luminous flux having passed through the second pupil region of the exit pupil 21 in the imaging optical system 20, the corrected signal $CS_{12}$ is the second signal.

The corrected signals $CS_{11}$ and $CS_{12}$ may be expressed as in Expression (8) and Expression (9) below by using Expression (3) to Expression (7).

$$CS_{11} = (S_1 * Fy11) * Fx11 \quad (8)$$
$$= iFFT\{FS_1 \cdot BP_{Fy11(fy)} \cdot BP_{Fx11(fx)} \cdot \exp[iHP_{Fx11(fx)}]\}$$
$$= iFFT\{Ff_{(fx,fy)} \cdot BP_{Fy11(fy)} \cdot MTF_{1(fx,fy)} \cdot$$
$$\exp[i(PTF_{1(fx,fy)} + PTF_{2(fx,0)} - PG_{2(fx,0)})]\}$$
$$\cong iFFT\{Ff_{(fx,0)} \cdot MTF_{1(fx,0)} \cdot$$
$$\exp[i(PTF_{1(fx,0)} + PTF_{2(fx,0)} - PG_{2(fx,0)})]\}$$

$$CS_{12} = (S_2 * Fy12) * Fx12 \quad (9)$$
$$= iFFT\{FS_2 \cdot BP_{Fy12(fy)} \cdot BP_{Fx12(fx)} \cdot \exp[iHP_{Fx12(fx)}]\}$$
$$= iFFT\{Ff_{(fx,fy)} \cdot BP_{Fy12(fy)} \cdot MTF_{2(fx,fy)} \cdot$$
$$\exp[i(PTF_{1(fx,fy)} + PTF_{2(fx,0)} - PG_{1(fx,0)})]\}$$
$$\cong iFFT\{Ff_{(fx,0)} \cdot MTF_{2(fx,0)} \cdot$$
$$\exp[i(PTF_{1(fx,0)} + PTF_{2(fx,0)} - PG_{1(fx,0)})]\}$$

The corrected signal $CS_{1j}$ (j=1 or 2) may be expressed as in Expression (10) (shown below) corresponding to Expression (2) by using a point spread function $CPSF_{1j}$ acquired by modifying $PSF_j$. The corrected signal $CS_{1j}$ (j=1 or 2) may be expressed as in Expression (11) (shown below) corresponding to Expression (3) by using a modulation transfer function $M_{cs1j}$ acquired by modifying $MTF_j$ and a phase transfer function $P_{cs1j}$ acquired by modifying $PTF_j$.

$$CS_{1j} = f * CPSF_{1j} \quad (10)$$

$$CS_{1j} = iFFT\{Ff_{(fx,fy)} \cdot M_{cs1j(fx,fy)} \cdot \exp[iP_{cs1j(fx,fy)}]\} \quad (11)$$

A phase difference between $P_{cs11}$ and $P_{cs12}$ determines a displaced amount caused by a defocus of the corresponding space frequency component and has a large influence on a shape difference between the pair of image signals.

Figure 6A:
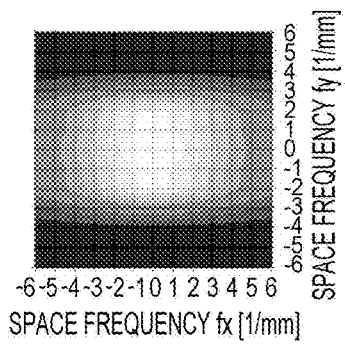
FIGS. 6A, 6B, 6C, 6D, 6E, and 6F illustrate a transformed point spread function according to the first embodiment.
Figure 6B:
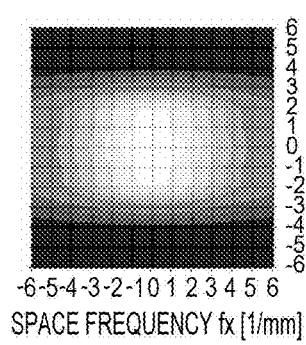
Figure 6C:
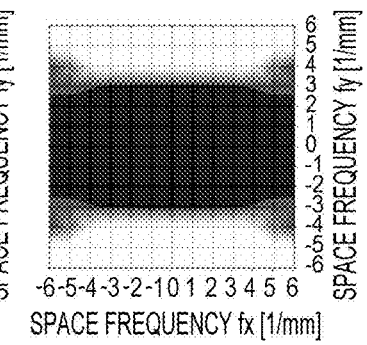
Figure 6D:
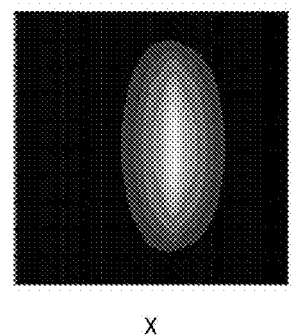
Figure 6E:
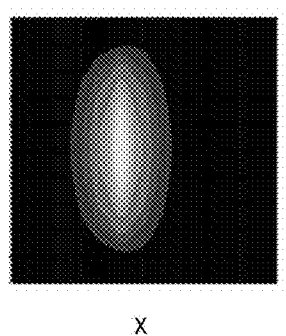
Figure 6F:
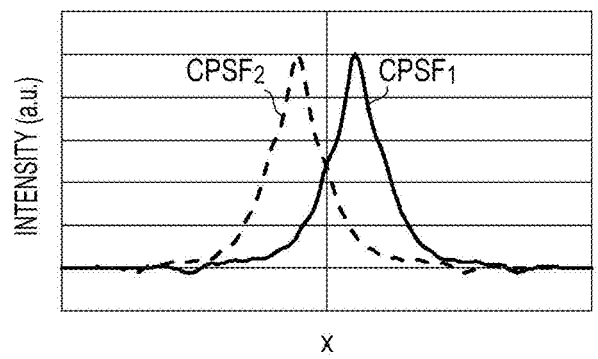

FIGS. 6A, 6B and 6C illustrate amounts acquired by converting $M_{cs11}$, $M_{cs12}$, and phase difference $P_{cs11}-P_{cs12}$ to a displaced amount of the space frequency components. The ordinate axes and abscissa axes indicate space frequencies fy and fx. FIGS. 6D and 6E illustrate $CPSF_{11}$ and $CPSF_{12}$, and the ordinate axes and abscissa axes indicate y-coordinates and x-coordinates. As values increase, the brightness increases in those drawings. FIG. 6F is a cross section taken in the x-direction of $CPSF_{11}$ and $CPSF_{12}$. The solid line indicates $CPSF_{11}$, and the broken line indicates $CPSF_{12}$.

The filters Fy11 and Fy12 inhibit $M_{cs11}$ and $M_{cs12}$ from having a component having a high space frequency fy as illustrated in FIGS. 6A and 6B. As a result, the corrected signals $CS_{11}$ and $CS_{12}$ have space frequencies fy limited in a band near 0. The phase terms $P_{cs1}$ and $P_{cs2}$ of the corrected signals dominantly have phases having space frequencies fy near 0. The difference $\Delta P_{cs1}$ between $P_{cs11}$ and $P_{cs12}$ may be expressed by Expression (12) (shown below) from Expression (8), Expression (9), and Expression (11) and dominantly have a phase component corresponding to a distance between centroids of the point spread functions.

$$\Delta P_{cs1} = P_{cs11(fx,fy)} - P_{cs12(fx,fy)} \cong PG_{1(fx,0)} - PG_{2(fx,0)} \quad (12)$$

As illustrated in FIG. 6C, the displaced amount is substantially a constant value in a band having the space frequency fy near 0. As illustrated in FIGS. 6D, 6E and 6F, the modified point spread functions have mutually identical shapes, and the corrected signals $CS_{11}$ and $CS_{12}$ have a reduced difference in shape. Use of the pair of corrected signals $CS_{11}$ and $CS_{12}$ allows highly accurate calculation of a displaced amount between the first signal corresponding to a luminous flux having passed through the first pupil region, and the second signal corresponding to the luminous flux having passed through the second pupil region and highly accurate calculation of a distance to the target of imaging.

Because filters Fy11 and Fy12 only have amplitude terms, information on the amplitude terms need only be recorded in the recording device 30. Alternatively, because the filter values have centro-symmetrical distributions, a filter value distribution on one side about a filter center need only be recorded. Without phase terms, the amount of data of filters to be recorded can be reduced. Furthermore, when the filters are identical, the amount of data on the filters to be recorded may further be reduced. The processing time for generating the filters may further be reduced advantageously.

The filter Fx1$j$ has filter values having a complicated distribution, and an error may be contained easily when the filter is generated, compared with the filter Fy1$j$. Thus, performing a filtering process using the filter Fx1$j$ and a filtering process using Fy1$j$ sequentially on the signal $S_1$ may cause an error diffusion in the y-direction after an error is added mainly toward the x-direction. Therefore, degradation of the corrected signal $CS_{1j}$ may occur. Therefore, performing a filtering process using Fy1$j$ first and then performing a filtering process using Fx1$j$ should reduce the range where an error contained in Fx1$j$ may be diffused. Thus, the degradation of the corrected signal CS' can be reduced.

Distance Calculation Process

As illustrated in FIG. 4A, the distance calculation unit 41 calculates a distance to a target of imaging from the displaced amount in the x-direction (first direction) of the corrected signals $CS_{11}$ and $CS_{12}$ (step S30). The displaced amount may be calculated by the displaced-amount calculation unit 43 by using the same method as that for the process for calculating a provisional displaced amount (step S10). A distance to a target of imaging may be calculated by acquiring a defocus amount ΔL by using Expression (13), for example, and from an image formation relationship of the imaging optical system 20.

$$\Delta L = \frac{dL}{w-d} \quad (13)$$

In Expression (13) d is a displaced amount, L is a distance between the exit pupil 21 and the image pickup device 10, and w is a baseline length.

Alternatively, a conversion coefficient that associates a displaced amount d and a defocus amount ΔL may be calculated in advance, and the detected displaced amount and the conversion coefficient may be used to calculate the defocus amount ΔL. Further alternatively, a conversion coefficient that associates a displaced amount and a distance to a target of imaging may be used to directly calculate a distance to the target of imaging. Thus, the operation for calculating a baseline length in accordance with an imaging condition and a position of a photoelectric conversion unit on an imaging plane may be omitted, which allows high-speed distance calculation.

Number of Cells of Image-Signal Correction Filter

The space frequency resolutions Δfx and Δfy in an x-direction and a y-direction of a general filter may be expressed by the following Expression (14) and Expression (15).

$$\Delta fx=1/Nx \quad (14)$$

$$\Delta fy=1/Ny \quad (15)$$

Nx and Ny above are the number of cells in an x-direction and y-direction, respectively, of a filter. As expressed in Expression (14) and Expression (15), as the values of Nx and Ny increase, the resolutions Δfx and Δfy increase, which allows generation of a filter having a desired frequency characteristic with high accuracy.

The filters Fy11 and Fy12 above control a space frequency band in the y-direction. In order to increase the space frequency resolution Δfy in the y-direction of the filters Fy11 and Fy12, Ay and Cy may be increased. Because a space frequency band in the x-direction may be controlled by the filters Fx11 and Fx12, the space frequency resolution Δfx in the x-direction of the filters Fy11 and Fy12 may be low. In other words, Ax and Cx may be lower values (1 at a minimum).

On the other hand, the filters Fx11 and Fx12 control a phase in the x-direction. In order to increase the space frequency resolution Δfx in the x-direction of the filters Fx11 and Fx12, Bx and Dx may be increased. Because a space frequency band in the y-direction is controlled by the filters Fy11 and Fy12, the space frequency resolution Δfy in the y-direction of the filters Fx11 and Fx12 may be low. In other words, By and Dy may be a small value (1 at a minimum). As described above, generation of filters such that relationships of Ay>Ax, Bx>By, Cy>Cx, and Dx>Dy may be satisfied and provide the image correction effect as described above.

The filters Fy11 and Fy12 being band pass filters may have an equal number of cells. The filters Fx11 and Fx12 being phase correction filters may have an equal number of cells and may have different cell values which correspond to each other.

According to past techniques, one filter is used to correct space frequency bands and phases in an x-direction and a y-direction. Therefore, both of the resolutions Δfx and Δfy must be high, and a filter having high Nx and Ny may be required. According to this embodiment on the other hand, a plurality of filters having a lower number of cells (number of taps) and having functions separately may be used to reduce the calculation load involved, which can reduce the time for image signal correction processing.

As the defocus amount (displaced amount) of the imaging optical system increases, a high frequency component of a target of imaging attenuates, and the width of a frequency band requiring a correction may be reduced. The resolution of a filter to be generated in accordance with each image displaced amount may be increased and the number of cells to be required therein may be increased as the displaced amount increases. A filter having an optimum number of cells in accordance with a displaced amount may be generated to reduce a calculation load.

According to this embodiment, the numbers of cells Ax, By, Cx, and Dy are 1, for example, but may be a magnitude excluding 1. As the numbers of cells Ax, By, Cx, and Dy are increased, the space frequency band having an amplitude or phase to be correctable may be increased, which allows ranging with higher accuracy. However, increased numbers of cells may increase the calculation load, and appropriate adjustment may need to be performed.

In order to acquire an equal accuracy of ranging to that of the present invention by using a total number of cells of filters in the past, the number of cells of a filter to be used for image signal correction processing on a first signal may be equal to Ay×Bx, and the number of cells of a filter to be used for image signal correction processing on a second signal may be equal to Cy×Dx. On the other hand, the number of cells of a filter to be used for image signal correction processing on a first signal according to this embodiment is Ay×Ax+Bx×By, and the number of cells of a filter to be used for image signal correction processing on a second signal is equal to Cy×Cx+Dx×Dy. In order to reduce the calculation load compared to the technologies in the past, Expression (16) or Expression (17) (shown below) can be satisfied. By rewriting Expression (16) and Expression (17), Expression (18) may be acquired.

$$\frac{Ax}{Bx} + \frac{By}{Ay} < 1 \quad (16)$$

$$\frac{Cx}{Dx} + \frac{Dy}{Cy} < 1 \quad (17)$$

$$\frac{N_{101}}{N_{201}} + \frac{N_{202}}{N_{102}} < 1 \quad (18)$$

Here, $N_{101}$ and $N_{102}$ are a number of cells in a first direction of a band pass filter (first filter or third filter) and a number of cells in a second direction of the band pass filter, respectively. $N_{201}$ and $N_{202}$ are a number of cells in a first direction of a phase correction filter (second filter or a fourth filter) and a number of cells in a second direction of the phase correction filter, respectively.

In a case where the number of cells in a shorter direction of each of the filters is equal to or lower than ¼ of the number of cells in the longitudinal direction, the calculation load may be greatly reduced. For example, assuming the numbers of cells in the longitudinal direction satisfy relationships of Bx=Ay and Dx=Cy and Ax=Ay/4, By=Bx/4, Cx=Cy/4, and Dy=Dx/4, the left side of Expression (16) to Expression (18) is equal to 0.5 which is equivalent to the half of the calculation load in the past.

Other Forms of Filtering Process

According to this embodiment, the filters Fy11 and Fy12 may be low pass filters which limit a space frequency fy in a y-direction to a vicinity of 0, for example. However, a filter which limits to another frequency band fy may be used. The space frequency bands limited by the filters Fy11 and Fy12 and the phase characteristics to be corrected by the filters Fx11 and Fx12 may be adjusted properly to acquire similar effects to the effects as described above.

A filtering process may be performed on one of the first signal $S_1$ and the second signal $S_2$, and ranging may be performed by using one signal having undergone image signal correction processing and the other signal not having undergone image signal correction processing of the first signal $S_1$ and the second signal $S_2$. In this case, because the phase term of a corrected signal corresponding to the one signal having undergone image signal correction processing is brought closer to the phase term of the other signal not having undergone image signal correction processing, the difference in shape between the corrected signal and the other signal may be reduced more than the difference in shape between the first signal and the second signal. Therefore, the number of calculation errors of the displaced amount may be reduced, and the accuracy of calculation of the defocus amount and distance can thus improve.

The phase adjustment terms $PG_1$ and $PG_2$ of the filters Fx11 and Fx12 are not limited to this embodiment but may be terms keeping a constant value independent of the space frequency in a real space and may be any known value. The phase adjustment terms $PG_1$ and $PG_2$ may be equal to 0 and may only be required not to have any influence on the shape of image signal.

The filters Fx11 and Fx12 may have amplitude terms $BP_{Fx11}$, $BP_{Fx12}$ which are not equal to 1. For example, the amplitude terms $BP_{Fx11}$ and $BP_{Fx12}$ in Expression (4) may have a band pass characteristic which limits a space frequency band in an x-direction to a predetermined band. By limiting the space frequency band, the width of the band needing a phase correction may be reduced. A filter having a desired phase characteristic may be generated easily in a narrowband even though the filter has a smaller number of cells and a low frequency resolution. A filter having a small number of cells (number of taps) may also provide a sufficient image correction effect, which may reduce the calculation load.

For example, $MTF_2$ and $MTF_1$ may be used in the amplitude terms $BP_{Fx11}$ and $BP_{Fx12}$, respectively. In this case, $M_{cs11}$ and $M_{cs12}$ may be $MTF_1$, $MTF_2$ and $BP_{Fy11}$ and $MTF_1$, $MTF_2$ and $BP_{Fy12}$, which are schematically the same functions. Therefore, the difference in shape between the corrected signals $CS_1$ and $CS_2$ may further be reduced, which allows ranging with higher accuracy.

Alternatively, the amplitude term $BP_{Fx11}$ may be $1/MTF_1$, and the amplitude term $BP_{Fx12}$ may be $1/MTF_2$. Alternatively, either one of them may have an amplitude term, and the amplitude term $BP_{Fx11}$ may be $MTF_2/MTF_1$, or the amplitude term $BP_{Fx12}$ may be $MTF_1/MTF_2$. Also in these cases, the amplitude terms $M_{cs11}$ and $M_{cs12}$ after the image signal correction may be substantially the same functions. Thus, the difference in shape between the corrected signals may further be reduced, which may allow ranging with higher accuracy.

The image correction processing may be performed after a different band pass filter from the first filter and third filter is applied to the signals $S_1$ and $S_2$. Because the space frequency bands contained in the signals are limited, the effect as described above may be acquired if the filters satisfy the filter characteristic in a partial space frequency band. Each of the filters may only be required to be generated such that the effect is acquired in a partial band only. Therefore, filters may be generated more easily, and the filter generation error may be reduced. The accuracy of image correction may improve, and ranging with higher accuracy may be achieved.

The transfer functions to be included in each filter may be a function approximated by using another function. Each of the filters may be generated by using a function acquired by approximating each of the transfer functions by using a polynomial expression. In a case where a band pass filter is applied to each of the signals as described above, a function having a characteristic approximated with a characteristic of a partial frequency band of each transfer function may be used to generate each filter. The effects of the image correction as described above may be generated by using filters generated by one of those methods.

The filters Fy11 and Fy12 may be configured such that the cell values within the band pass filters are all equal. By applying such filters, a high frequency component may be removed, and a low pass (band pass) effect may be acquired. Because such filters may not require recording a distribution of cell values, the storage capacity of a recording device to record filter data can be reduced.

According to this embodiment, a processing method has been described which generates a corrected signal by performing convolution on each signals by the filters in a real space. However, the image signal correction processing may be performed in a frequency space. Filter data (data within the parentheses of an inverse Fourier transform iFFT in Expression (3) and Expression (4)) in a frequency space may be retained in advance. Next, a Fourier transform is performed on the acquired signals $S_1$ and $S_2$ to generate corrected signals $FS_{11}$ and $FS_{12}$ in the frequency space. Each of the filters are applied to the corrected signals $FS_{11}$ and $FS_{12}$, and an inverse Fourier transform is performed thereon so that the corrected signals $CS_{11}$ and $CS_{12}$ may be generated. The calculation load in applying the filters may be reduced more than a case where the convolution is performed so that high speed and highly accurate ranging can be achieved.

The phase term in Expression (5) changes in a complicated manner in accordance with the image displaced amount (defocus amount) and space frequency, compared with the amplitude term. The filters having phase terms have cell values each of which change in a complicated manner in accordance with its position within the filter and image displaced amount. The filters Fy11 and Fy12 do not have a phase term but include an amplitude term. This may result in a filter which varies less even when the items as above change. Thus, filter data may be easily retained by the interpolation and function approximation methods. Therefore, filters may be generated by using a less data amount with high accuracy. The characteristics of the filters Fy11 and Fy12 may be adjusted such that the filters are identical. Thus, the amount of filter data to be retained can be reduced, and the data amount can further be reduced.

Ranging Result

A ranging result of the distance detecting device according to the present invention is applicable to a focal point detection of an imaging optical system, for example. The distance detecting device of the present invention allows measurement of a distance to a target of imaging at high speed and with high accuracy and may provide a displaced amount between the target of imaging and a focal point position of an imaging optical system. A focal point position of an imaging optical system may be controlled such that a focal point position may be adjusted to a target of imaging quickly and highly accurately. An imaging apparatus such as a digital still camera and a digital video camera may include the distance detecting device of this embodiment, and a focal point of an optical system can be detected based on a distance detection result from the distance detecting device. The distance detecting device of the present invention may be used to generate a distance map.

Second Embodiment

According to a second embodiment, the image signal correction processing (step S20 in FIG. 4A) may include image signal correction processing to be performed on signals by using filters Fx21 and Fx22 having different phase terms from those of the filters Fx11 (second filter) and Fx12 (fourth filter) of the first embodiment. Because the rest of this embodiment is the same as the first embodiment, differences from the first embodiment will be described mainly.

The filter Fx21 (second filter) has Cx (where Cx is an integer equal to or higher than 2)×Cy (where Cy is an integer equal to or higher than 1 and lower than Cx) cells and is a phase correction filter which corrects a phase in an x-direction of each space frequency component of a signal $S_1$. However, according to this embodiment, Cy=1 is assumed in the following description.

The filter Fx22 (fourth filter) has Dx (where Dx is an integer equal to or higher than 2)×Dy (where Dy is an integer equal to or higher than 1 and lower than Dx) cells and is a phase correction filter which corrects a phase in the x-direction of each space frequency component of a signal $S_2$. According to this embodiment, Dy=1 is assumed in the following description.

According to this embodiment, the filters Fx21 and Fx22 are filters which control phases of space frequency components only and do not correct amplitudes. The filter Fx21 is a phase compensation filter corresponding to an optical transfer function $OTF_1$, and the filter Fx22 is a phase compensation filter corresponding to an optical transfer function $OTF_2$. More specifically, the filter Fx21 is a filter having a phase transfer function $PIT_1$ in its phase term, and the filter Fx22 is a filter having a phase transfer function $PTF_2$ in its phase term. The filter Fx2j (where j=1 or 2) is expressed by the following Expression (19)

$$Fx2j = iFFT\{BP_{Fx2j(fx)} \cdot \exp[iHP_{Fx2j(fx)}]\} \quad (19)$$

$$= iFFT\{\exp[i(-PTF_{j(fx,0)} + PG_{j(fx,0)})]\}$$

$BP_{Fx2j}$ is an amplitude term of the filter Fx2j. However, because the filter Fx2j is a filter which corrects a phase only, it is assumed here that $BP_{Fx2j}$ is equal to 1. $HP_{Fx2j}$ is a phase term of the filter Fx2j. $PTF_{j(fx,0)}$ represents a phase with a space frequency fy of $PTF_j$ equal to 0. The filter Fx2j has a phase term having a function acquired by inverting the sign of $PTF_{j(fx,0)}$ (or multiplying −1). In a case where relationships $PTF_1=-PTF_2$ and $PG_1=-PG_2$ are satisfied, the filters Fx21 and Fx22 are the same as the filters Fx11 and Fx12, respectively, of the first embodiment and correspond to the filters illustrated in FIGS. 5A to 5D. For example, it may applicable to a case where ranging is performed under a condition where $PSF_1$ and $PSF_2$ are symmetrical to each other about a center of the image pickup device 10.

The filters Fy11 and Fx21 are sequentially applied to the first signal $S_1$ to perform a filtering process and thus generate a corrected signal $CS_{21}$. The filters Fy12 and Fx22 are sequentially applied to the second signal $S_2$ to perform a filtering process and thus generate a corrected signal $CS_{22}$. Like the first embodiment, the distance calculation process (step S30 in FIG. 4A) calculates a displaced amount in an x-direction (first direction) of the corrected signal $CS_{21}$ and the corrected signal $CS_{22}$. A defocus amount may be acquired by using a publicly known method from the acquired displaced amount, and a distance to a target of imaging can thus be calculated. The corrected signal $CS_{2j}$ may be expressed as in Expression (20) by using Expression (3) to Expression (7) and Expression (19).

$$CS_{2j} = (S_1 * Fy1j) * Fx2j \quad (20)$$

$$= iFFT\{FS_1 \cdot BP_{Fy1j(fy)} \cdot BP_{Fx2j(fx)} \cdot \exp[iHP_{Fx2j(fx)}]\}$$

$$= iFFT\{Ff_{(fx,fy)} \cdot BP_{Fy1j(fy)} \cdot MTF_{j(fx,fy)} \cdot$$

$$\exp[i(PTF_{j(fx,fy)} - PTF_{j(fx,0)} + PG_{j(fx,0)})]\}$$

$$\cong iFFT\{Ff_{(fx,0)} \cdot MTF_{j(fx,0)} \cdot \exp[iPG_{j(fx,0)}]\}$$

The corrected signal $CS_{2j}$ (where j=1 or 2) may be expressed by Expression (21) corresponding to Expression (3) by using a modulation transfer function $M_{cs2j}$ transformed from $MTF_j$ and a phase transfer function $P_{cs2j}$ transformed from $PTF_j$.

$$CS_{2j} = iFFT\{Ff_{(fx,fy)} \cdot M_{cs2j(fx,fy)} \cdot \exp[iP_{cs2j(fx,fy)}]\} \quad (21)$$

A difference $\Delta P_{cs2}$ between $P_{cs21}$ and $P_{cs22}$ determines an image displaced amount caused by a defocus of each space frequency component and has a large influence on a difference in shape between a pair of image signals. Like the first embodiment, the filters Fy11 and Fy12 are applied so that the corrected signals $CS_{21}$ and $CS_{22}$ have a space frequency fy limited to a band near 0. $P_{cs21}$ and $P_{cs22}$ dominantly have a phase having a space frequency fy near 0. Applying Expression (20) and Expression (21) to the difference $\Delta P_{cs2}$ between $P_{cs21}$ and $P_{cs22}$ results in a phase component corresponding to a centroid interval of each point spread function as in Expression (22).

$$\Delta P_{cs2} = P_{cs21(fx,fy)} - P_{cs22(fx,fy)} \cong PG_{1(fx,0)} - PG_{2(fx,0)} \quad (22)$$

This results in signals having substantially a constant image displaced amount of space frequency components with reduced difference in shape therebetween. The pair of corrected signals $CS_{21}$ and $CS_{22}$ may be used to calculate with high accuracy a displaced amount between a first signal corresponding to a luminous flux having passed through a first pupil region and a second signal corresponding to a luminous flux having passed through a second pupil region, and calculate with high accuracy a distance to a target of imaging.

Like the first embodiment, the filters Fx21 and Fx22 may be filters having amplitude terms $BP_{Fx21}$ and $BP_{Fx21}$, and may be configured to have $MTF_{12}$ and $MTF_{11}$ characteristics and band pass characteristics, for example. The same effects as described above may thus be acquired.

Details described according to this embodiment are not limited to the forms as described above. Like the first embodiment, a filtering process can be performed on one of the first signal $S_1$ and the second signal $S_2$, and ranging can be performed by using one signal having undergone image signal correction processing and the other signal not having undergone image signal correction processing of the first signal $S_1$ and the second signal $S_2$. Also in this case, because the phase term of a corrected signal corresponding to the one signal having undergone image signal correction processing is brought closer to the phase term of the other signal not having undergone image signal correction processing, the difference in shape between the corrected signal and the other signal may be reduced more than the difference in shape between the first signal and the second signal. Therefore, the number of calculation errors of the displaced amount can be reduced, and the accuracy of calculation of the defocus amount and distance can thus improve. Various image correction methods and distance calculation methods according to the first embodiment may also be applicable.

Third Embodiment

According to a third embodiment, the image signal correction processing (step S20 in FIG. 4A) includes image signal correction processing to be performed on a first signal $S_1$ by using a filter Fx31 (phase correction filter) having a different phase term from that of the filter Fx11 of the first embodiment. The image signal correction processing on the second signal $S_2$ may include a filtering process using the filter Fy12 (band pass filter) only without performing a filtering process using the filter Fx12. Because the rest of this embodiment is the same as the first embodiment, differences from the first embodiment will be described mainly.

The filter Fx31 (second filter) has Cx (where Cx is an integer equal to or higher than 2)×Cy (where Cy is an integer equal to or higher than 1 and lower than Cx) cells and is a filter which corrects a phase in an x-direction of each space frequency component of the signal $S_1$. However, according to this embodiment, Cy=1 is assumed in the following description.

According to this embodiment, the filter Fx31 is a filter which controls phases of space frequency components only and does not correct amplitudes and corresponds to optical transfer functions $OTF_1$ and $OTF_2$. More specifically, the filter Fx31 is a filter having a function based on a difference between a phase transfer function $PTF_1$ and a phase transfer function $PTF_2$ in its phase term. The filter Fx31 may be expressed by Expression (23).

$$Fx31 = iFFT\{BP_{Fx31} \cdot \exp[iHP_{Fx31}]\} \quad (23)$$
$$= iFFT\{\exp[i(-PTF_{1(fx,0)} + PTF_{2(fx,0)} + PG_{1(fx,0)} - PG_{2(fx,0)})]\}$$

The $BP_{Fx31}$ and $HP_{Fx31}$ are an amplitude term of the filter Fx31 and a phase term of the filter Fx31, respectively. Because the filter Fx31 is a filter which corrects a phase only, it is assumed here that $BP_{Fx31}$ is equal to 1. $PTF_{j(fx,0)}$ represents a phase with a space frequency fy of the phase transfer function $PTF_j$ equal to 0.

Figure 7:
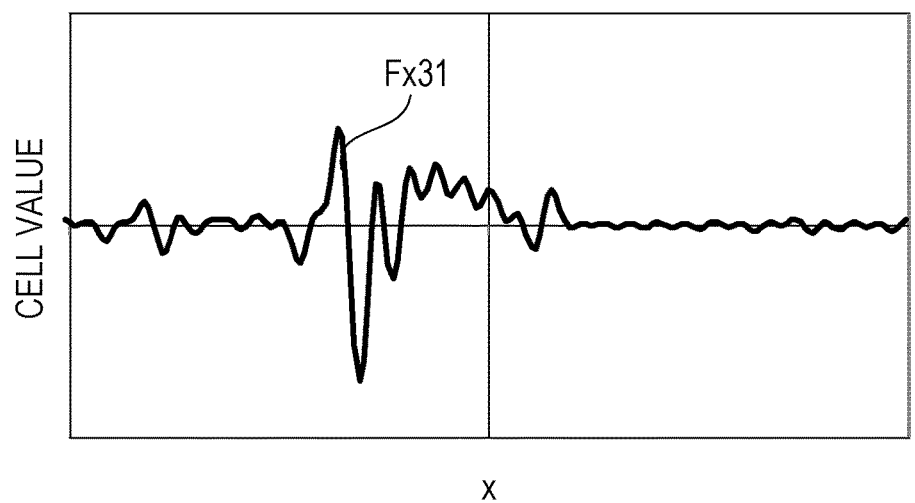
FIG. 7 illustrates a filter for image signal correction processing according to a third embodiment.

FIG. 7 illustrates cell values of the filter Fx31. As illustrated in FIG. 7, the filter Fx31 has cell values having a central asymmetrical distribution in the x-direction.

The filters Fy11 and Fx31 are sequentially applied to the first signal $S_1$ to perform a filtering process and thus generate a corrected signal $CS_{31}$. The filter Fy12 is applied to the second signal $S_2$ to perform a filtering process and thus generate a corrected signal $CS_{32}$.

Like the first embodiment, a distance calculation process (step S30 in FIG. 4A) calculates a displaced amount in an x-direction (first direction) of the corrected signal $CS_{31}$ and the corrected signal $CS_{32}$. A defocus amount can be acquired by using a publicly known method from the acquired displaced amount, and a distance to a target of imaging can thus be calculated. The corrected signals $CS_{31}$ and $CS_{32}$ may be expressed as in Expression (24) and Expression (25) (shown below) by using Expression (3) to Expression (7) and Expression (23).

$$CS_{31} = (S_1 * Fy11) * Fx31 \quad (24)$$
$$= iFFT\{FS_1 \cdot BP_{Fy11(fy)} \cdot BP_{Fx31(fx)} \cdot \exp[iHP_{Fx31(fx)}]\}$$
$$= iFFT\{Ff_{(fx,fy)} \cdot BP_{Fy11(fy)} \cdot MTF_{1(fx,fy)} \cdot \exp[i(PTF_{1(fx,fy)} - PTF_{1(fx,0)} + PTF_{2(fx,0)} + PG_{1(fx,0)} - PG_{2(fx,0)})]\}$$
$$\cong iFFT\{Ff_{(fx,0)} \cdot MTF_{1(fx,0)} \cdot \exp[i(PTF_{2(fx,0)} + PG_{1(fx,0)} - PG_{2(fx,0)})]\}$$

$$CS_{32} = S_2 * Fy12 \quad (25)$$
$$= iFFT\{FS_2 \cdot BP_{Fy12(fy)}\}$$
$$= iFFT\{Ff_{(fx,fy)} \cdot BP_{Fy12(fy)} \cdot MTF_{2(fx,fy)} \cdot \exp[i(PTF_{1(fx,fy)})]\}$$
$$\cong iFFT\{Ff_{(fx,0)} \cdot MTF_{2(fx,0)} \cdot \exp[iPTF_{2(fx,0)}]\}$$

The corrected signal $CS_{3j}$ (where j=1 or 2) may be expressed by Expression (26) corresponding to Expression (3) by using a modulation transfer function $M_{cs3j}$ transformed from $MTF_j$ and a phase transfer function $P_{cs3j}$ transformed from $PTF_j$.

$$CS_{3j} = iFFT\{Ff_{(fx,fy)} \cdot M_{cs3j(fx,fy)} \cdot \exp[iP_{cs3j(fx,fy)}]\} \quad (26)$$

A difference $\Delta P_{cs3}$ between $P_{cs31}$ and $P_{cs32}$ determines an image displaced amount caused by a defocus of each space frequency component, and has a large influence on a difference in shape between a pair of image signals.

Like the first embodiment, the filters Fy11 and Fy12 are applied so that the corrected signals $CS_{31}$ and $CS_{32}$ may have a space frequency fy limited to a band near 0. $P_{cs31}$ and $P_{cs32}$ dominantly have a phase having a space frequency fy near 0. Applying Expression (24) to Expression (26) to the difference $\Delta P_{cs3}$ between $P_{cs31}$ and $P_{cs32}$ results in a phase component corresponding to a centroid interval of each point spread function as in the following Expression (27).

$$\Delta P_{cs3} = P_{cs31(fx,fy)} - P_{cs32(fx,fy)} \cong PG_{1(fx,0)} - PG_{2(fx,0)} \quad (27)$$

This results in signals having substantially a constant image displaced amount of space frequency components with reduced difference in shape therebetween. The pair of corrected signals $CS_{31}$ and $CS_{32}$ can be used to calculate with high accuracy a displaced amount between a first signal corresponding to a luminous flux having passed through a first pupil region and a second signal corresponding to a luminous flux having passed through a second pupil region, and calculate with high accuracy a distance to a target of imaging.

By using this filter, only one filter may be applied to one signal to generate a corrected signal so that the calculation load of an image correction process can further be reduced. Furthermore, the required space for retaining filter data to be recorded in advance can be reduced.

The filter Fx31 may be a filter having the amplitude term $BP_{Fx31}$ and may be configured so as to have a characteristic acquired by dividing $MTF_{12}$ by $MTF_{11}$ and a band pass characteristic. The same effects as described above may thus be acquired.

Details described according to this embodiment are not limited to the forms as described above. Like the first embodiment, a filtering process may be performed on one of the first signal $S_1$ and the second signal $S_2$, and ranging may be performed by using one signal having undergone image signal correction processing and the other signal not having undergone image signal correction processing of the first signal $S_1$ and the second signal $S_2$. Also in this case, because the phase term of a corrected signal corresponding to the one signal having undergone image signal correction processing is brought closer to the phase term of the other signal not having undergone image signal correction processing, the difference in shape between the corrected signal and the other signal may be reduced more than the difference in shape between the first signal and the second signal. Therefore, the number of calculation errors of the displaced amount may be reduced, and the accuracy of calculation of the defocus amount and distance may thus improve. Various image correction methods and distance calculation methods according to the first embodiment may also be applicable.

Fourth Embodiment

According to this embodiment, instead of the filtering processes using the band pass filters Fy11, Fy12 according to the first embodiment, a signal addition process, which will be described below, is performed. Because the rest of this embodiment is the same as the first embodiment, differences from the first embodiment will be described mainly.

The signal addition process may be implemented by providing a signal addition circuit which adds an electric signal acquired by a photoelectric conversion unit 11 (or 12) in a surrounding pixel of a pixel 13 to an electric signal acquired by a photoelectric conversion unit 11 (or 12) in the pixel 13 of an image pickup device 10. More specifically, the number of signals (number of pixels) to be used for signal addition is determined based on the provisional displaced amount calculated by the process for calculating a provisional displaced amount in step S10. Then, the electric signal generated by a photoelectric conversion unit in a surrounding pixel of a target pixel to an electric signal generated by the photoelectric conversion unit in the target pixel. This signal addition process is performed on the electric signal corresponding to the position of a pixel of the first signal and the second signal to generate signals $S_1'$ and $S_2'$. Then, the filters Fx11 and Fx12 are used to perform a filtering process on the signals $S_1'$ and $S_2'$ to generate corrected signals.

The number of pixels may be equivalent to the magnitude of the number of cells of the band pass filters Fy11 and Fy12 according to first embodiment so that an equivalent result may be acquired to that of the filtering process using the band pass filters Fy11 and Fy12 according to the first embodiment. Use of the signal addition circuit may allow high-speed image signal correction processing.

The distance detecting device has the signal addition circuit (not illustrated), which adds an electric signal (component) corresponding to a photoelectric conversion unit in a surrounding pixel of a target pixel to an electric signal (component) corresponding to a photoelectric conversion unit in the target pixel, in at least one of the first signal and the second signal. In other words, in the signal addition on the first signal, the signal addition circuit adds an electric signal (component) corresponding to the photoelectric conversion unit 11 in a surrounding pixel of a target pixel in the first signal to an electric signal (component) corresponding to the photoelectric conversion unit 11 in the target pixel in the first signal. The similar signal addition may also be performed on the second signal, or a filtering process may be performed by using the band pass filters according to the first to fourth embodiments. The signal addition process using the signal addition circuit according to this embodiment may be performed on the second signal, and the filtering process using the band pass filters according to the first to fourth embodiments may be performed on the first signal.

The signal processing unit in the distance detecting device has a function for performing a filtering process on at least one of the first signal, and the second signal by using a phase correction filter having more cells in a first direction perpendicular to a second direction than the number of cells in the second direction. The signal having undergone the filtering process by using the phase correction filter may be a signal having undergone the signal addition in the signal addition circuit between the first signal and the second signal. Alternatively, the signal may be a signal having undergone the filtering process using the band pass filter by using the first to fourth embodiments between the first signal and the second signal, without the signal addition in the signal addition circuit. Both of the first signal and the second signal may undergo the filtering process using the phase correction filter.

This embodiment is also applicable to the second or third embodiment.

Fifth Embodiment

A fifth embodiment is different from the first embodiment in that the distance detecting device further has a determination unit (not illustrated) which determines whether image signal correction processing is to be performed or not based on the magnitude of the displaced amount calculated by the displaced-amount calculation unit 43. FIG. 8 illustrates a distance detecting method according to this embodiment.

The difference in shape between the first signal $S_1$ and the second signal $S_2$ increases as the defocus amount and the displaced amount increase. Thus, when the displaced amount is large, a large error may occur in detection of the displaced amount, and the accuracy of ranging may decrease. On the other hand, because a small error may occur in detection of a displaced amount when the displaced amount is small, the reduction of the accuracy of ranging is not large. Thus, as illustrated in FIG. 7, a process for determining whether the provisional displaced amount between the first signal $S_1$ and the second signal $S_2$ is higher than a threshold value or not (step S40) is performed after the process for calculating the provisional displaced amount in step S10.

When the displaced amount is higher than the threshold value, the same image signal correction process (step S20) as that of the first embodiment is performed, and the distance calculation process (step S30) is performed. On the other hand, if the displaced amount is equal to or lower than the threshold value, the distance calculation process (step S30) is performed by defining the provisional displaced amount as a displaced amount without performing the image signal correction process (step S20). The magnitude of the threshold value may be determined by comparing an error in detection of a displaced amount and a permissible error. The permissible error for the displaced amount may be determined in accordance with a desired accuracy of ranging and the configuration or application of the distance detecting device.

Providing the determination process allows appropriate ranging to be performed in accordance with a schematic distance (defocus amount) to a target of imaging and thus allows high-speed and highly accurate ranging.

This embodiment is applicable to any one of the second to fourth embodiments.

Sixth Embodiment

Having described the example in which a distance to a target of imaging is calculated according to the aforementioned embodiments, the present invention is also applicable to a parallax-amount detecting device which detects a parallax amount corresponding to a displaced amount. For example, the parallax-amount detecting device may perform a process for cutting out a target of imaging near an in-focus position from an image, for example, based on a displaced amount. The parallax amount here may refer to a displaced amount between two signals or may be a physical quantity related thereto.

The parallax-amount detecting device may have a parallax-amount calculation unit which calculates a parallax amount corresponding to a displaced amount between two signals instead of the distance calculation unit 41 in the distance detecting device 40 according to the first to fifth embodiments. The rest of the configuration may be the same as that of the distance detecting device 40. The two signals here may refer, more specifically, to a corrected signal acquired by performing an image signal correction process on a first signal and a corrected signal acquired by performing an image signal correction process on a second signal. The parallax-amount detecting device further has an extraction unit which extracts a target of imaging with a predetermined parallax amount from an image in accordance with a parallax amount (displaced amount).

The parallax amount detecting method of this embodiment may perform a process for calculating a parallax amount instead of the distance calculation process in step S30 in the flowchart in FIG. 4A, and the other processing steps may be performed as in FIGS. 4A and 4B. The parallax-amount calculation may be performed by calculating a defocus amount by using Expression (13) or by calculating a displaced amount of signals and calculating a physical quantity relating to them.

Also according to this embodiment, because a filtering process using two one-dimensional image-signal correction filters having functions divided into two is performed on at least one of a pair of image signals, a parallax amount may be detected at a high speed and with high accuracy.

The parallax-amount detecting device may also be used as a part of the imaging apparatus, like the distance detecting device according to the first to fifth embodiments. Also according to this embodiment, the image signal correction processing may be performed in a frequency space, like the other embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2014-074577, filed Mar. 31, 2014, which is hereby incorporated by reference herein in its entirety.

What is claimed is:

1. A distance detecting device comprising:
   a processor; and
   a memory containing instructions that, when executed by the processor, cause the processor to perform operations comprising:
   correcting at least one of first and second signals corresponding to first and second luminous fluxes passing through first and second pupil regions, respectively, of an exit pupil in an imaging optical system by using one of a band pass filter having a lower number of cells in a first direction than a number of cells in a second direction perpendicular to the first direction, and a phase correction filter having a higher number of cells in the first direction than the number of cells in the second direction; and
   calculating a distance to a target of imaging based on the corrected at least one of the first and second signals.

2. The distance detecting device according to claim 1, wherein the band pass filter and the phase correction filter have numbers of cells which satisfy:

$$\frac{N_{101}}{N_{201}} + \frac{N_{202}}{N_{102}} < 1$$

where $N_{101}$ and $N_{102}$ are the number of cells in the first direction and the second direction, respectively, of the band pass filter, and $N_{201}$ and $N_{202}$ are the number of cells in the first direction and the second direction, respectively, of the phase correction filter.

3. The distance detecting device according to claim 1, wherein the number of cells in the first direction of the band pass filter is equal to or lower than ¼ of the number of cells in the second direction of the band pass filter; and the number of cells in the second direction of the phase correction filter is equal to or lower than ¼ of the number of cells in the first direction of the phase correction filter.

4. The distance detecting device according to claim 1, wherein the number of cells in the first direction of the band pass filter is equal to 1.

5. The distance detecting device according to claim 1, wherein the number of cells in the second direction of the phase correction filter is equal to 1.

6. The distance detecting device according to claim 1, wherein the phase correction filter is a filter based on at least one of an optical transfer function corresponding to the first pupil region and an optical transfer function corresponding to the second pupil region.

7. The distance detecting device according to claim 1, wherein correcting comprises performing a filtering process on the first signal and the second signal by using the band pass filter and the phase correction filter.

8. The distance detecting device according to claim 7, wherein
the phase correction filter is represented by a function having an amplitude term and a phase term in a frequency space, and the phase correction filter usable for performing a filtering process on the first signal is a filter having a phase transfer function corresponding to the second pupil region in the phase term; and
the phase correction filter usable for performing a filtering process on the second signal is a filter having a phase transfer function corresponding to the first pupil region in the phase term.

9. The distance detecting device according to claim 7, wherein
the phase correction filter is represented by a function having an amplitude term and a phase term in a frequency space, and the phase correction filter usable for performing a filtering process on the first signal is a filter having a function with an inverted sign of a sign of a phase transfer function corresponding to the first pupil region in the phase term; and
the phase correction filter usable for performing a filtering process on the second signal is a filter having a function with an inverted sign of a sign of a phase transfer function corresponding to the second pupil region in the phase term.

10. The distance detecting device according to claim 1, wherein
correcting comprises performing a filtering process on the first signal by using the band pass filter and the phase correction filter, and
correcting further comprises performing a filtering process on the second signal by using the band pass filter only.

11. The distance detecting device according to claim 10, wherein the phase correction filter is represented by a function having an amplitude term and a phase term in a frequency space, and the phase correction filter is a filter having a function based on a difference between a phase transfer function corresponding to the second pupil region and a phase transfer function corresponding to the first pupil region in the phase term.

12. The distance detecting device according to claim 1, wherein the operations further comprise calculating a provisional displaced amount between the first signal and the second signal.

13. The distance detecting device according to claim 12, wherein if the displaced amount is higher than a threshold value, correcting comprises performing a filtering process on the first signal and the second signal.

14. The imaging apparatus according to claim 12, wherein correcting comprises generating the one of the band pass filters and the phase correction filters based on the provisional displaced amount.

15. The distance detecting device according to claim 1, wherein the first direction corresponds to a direction in which the exit pupil is divided into the first pupil region and the second pupil region.

16. An imaging apparatus comprising:
an imaging optical system having the first pupil region and the second pupil region;
an image pickup device which generates the first signal and the second signal; and
the distance detecting device according to claim 1.

17. An imaging apparatus according to claim 16, wherein
the image pickup device has a plurality of pixels arranged two-dimensionally;
the first direction corresponds to a direction in which the exit pupil is divided into the first pupil region and the second pupil region on a plane having the plurality of pixels; and
the second direction corresponds to a direction perpendicular to the first direction on a plane having the plurality of pixels.

18. A distance detecting method comprising:
correcting at least one of first and second signals corresponding to first and second luminous fluxes passing through first and second pupil regions, respectively, of an exit pupil in an imaging optical system by using one of a band pass filter having a lower number of cells in a first direction than a number of cells in a second direction perpendicular to the first direction, and a filter for phase correction having a higher number of cells in the first direction than the number of cells in the second direction; and
calculating a distance to a target of imaging based on the corrected at least one of the first and second signals.

19. A parallax-amount detecting device comprising:
a processor; and
a memory containing instructions that, when executed by the processor, cause the processor to perform operations comprising:
correcting at least one of first and second signals corresponding to first and second luminous fluxes passing through first and second pupil regions, respectively, of an exit pupil in an imaging optical system by using one of a band pass filter having a lower number of cells in a first direction than a number of cells in a second direction perpendicular to the first direction and a phase correction filter having a higher number of cells in the first direction than the number of cells in the second direction; and
calculating a parallax amount based on the corrected at least one of the first and second signals.

20. An imaging apparatus comprising:
the imaging optical system having the first and second pupil regions;
an image pickup device which generates the first and second signals; and the parallax-amount detecting device according to claim 19.

21. An imaging apparatus comprising:
an imaging optical system having a first pupil region and a second pupil region which is different from the first pupil region;
an image pickup device having a plurality of pixels, each of the pixels including a photoelectric conversion unit which generates a component of a first signal corresponding to a luminous flux passing through the first pupil region and a photoelectric conversion unit which generates a component of a second signal corresponding to a luminous flux passing through the second pupil region;
a processor; and
a memory containing instructions that, when executed by the processor, cause the processor to perform operations comprising:
adding a component corresponding to a photoelectric conversion unit in a surrounding pixel of a target pixel to a component corresponding to a photoelectric conversion unit in the target pixel in at least one of the first signal and the second signal, and
correcting at least one of the first signal and the second signal by using a phase correction filter having a higher number of cells in a first direction than a number of cells in a second direction perpendicular to the first direction; and
calculating a distance to a target of imaging based on the corrected at least one of the first and second signals.

* * * * *